United States Patent [19]

Roscamp et al.

[11] Patent Number: 4,764,834

[45] Date of Patent: Aug. 16, 1988

[54] THIN FILM MAGNETIC TRANSDUCER HAVING A SEPARATE MAGNETICALLY CONDUCTIVE LAYER

[75] Inventors: Thomas A. Roscamp, Santa Barbara; Paul D. Frank, Goleta; Gary E. Roberts, Lompoc; Allan F. Rice, Santa Barbara, all of Calif.

[73] Assignee: Applied Magnetics Corporation, Goleta, Calif.

[21] Appl. No.: 9,588

[22] Filed: Jan. 29, 1987

Related U.S. Application Data

[63] Continuation of Ser. No. 715,070, Mar. 22, 1985, abandoned, which is a continuation of Ser. No. 117,872, Feb. 4, 1980, abandoned.

[51] Int. Cl.$^4$ ............................................. G11B 5/147
[52] U.S. Cl. .................................... 365/126; 360/122
[58] Field of Search ...................... 360/126, 119–121, 360/125, 123, 127, 122

[56] References Cited

U.S. PATENT DOCUMENTS

| | | | |
|---|---|---|---|
| 3,639,699 | 2/1972 | Tiemann | 360/126 |
| 3,987,488 | 10/1976 | Kanai et al. | 360/121 |
| 4,092,688 | 5/1978 | Nomura et al. | 360/121 |
| 4,149,205 | 4/1979 | Berghof et al. | 360/126 |
| 4,190,872 | 2/1980 | Jones, Jr. et al. | 360/125 |
| 4,219,854 | 8/1980 | Church et al. | 360/125 |
| 4,241,367 | 12/1980 | Nomura et al. | 360/127 |
| 4,295,173 | 10/1981 | Romankiw et al. | 360/125 |

OTHER PUBLICATIONS

L. T. Romankiw et al., "Design of Seperately Optimized Thin Film Read/Write Magnetic Recording Heads", *IBM TDB*, vol. 23, No. 5, Oct. 1980, pp. 2148–2149.

*Primary Examiner*—John H. Wolff
*Assistant Examiner*—David J. Severin
*Attorney, Agent, or Firm*—Daniel J. Meaney, Jr.

[57] ABSTRACT

A thin film transducer having a substrate, a first and second pole piece formed of a selected magnetic material and terminating in a gap, a coil positioned between the first and second pole pieces and a magnetically conductive layer formed of a material having selected chemical, magnetic and physical properties and having a known magnetic saturation flux density and being positioned contiguous at least one of the first pole piece and second pole piece and rearward of the edges forming the gap to conduct magnetic flux in parallel to the pole pieces and to increase and concentrate the magnetic flux density at the edges of the first and second pole piece defining the gap is shown.

6 Claims, 1 Drawing Sheet

THIN FILM MAGNETIC TRANSDUCER HAVING A SEPARATE MAGNETICALLY CONDUCTIVE LAYER

This application is a continuation, of application Ser. No. 06/715,070 now abandoned filed Mar. 22, 1985, which is a continuation of Ser. No. 06/117,872, now abandoned filed Feb. 4, 1980.

BACKGROUND OF THE INVENTION

1. Field of the Invention

This invention relates to thin film magnetic transducers having an improved writing characteristic and more particularly to an improved thin film magnetic transducer having one or more magnetically conductive layers formed of a material having selected chemical, magnetic and physical properties which cooperates with the magnetic material forming the pole pieces to reduce pole piece saturation in response to a write current and to increase the magnetic flux density in the gap during the writing of information on adjacent magnetic media resulting in greater

2. Description of the Prior Art

Thin film magnetic transducers are known in the prior art. One such typical thin film magnetic head formed by vacuum deposition is disclosed in an article entitled "Thin-Film Magnetic Heads Excel in Packing and Moving Data" by Thomas A. Roscamp and Paul D. Frank which appeared in the Mar. 3, 1977 issue of *Electronics*.

The use of thin film magnetic transducers has enabled fabrication of integrated thin film magnetic heads which have improved frequency response, higher bit packing density, higher track density and increased reliability; typically, bit packing densities of 12,000 bits per inch and 1,000 tracks per inch can be achieved with integrated thin film transducers.

During the reproducing or reading operation, thin film magnetic transducers having pole pieces comprising a single layer magnetically oriented film exhibit Barkhausen noise due to the presence of magnetic domains and the resulting nonuniformity in switching. A means of overcoming domain formation by use of a plurality of separate magnetic layers with alternating magnetizations is described in the abovereferenced article by Roscamp and Frank which appeared in the Mar. 3, 1977 issue of *Electronics*.

In addition to thin film magnetic transducers producing Barkhausen noise during switching, such known thin film transducers produce delays and distortions of the read signals. The delays and distortions so produced are due to variable domain structures which occur in single, magnetically oriented layers which define the pole pieces. The domains in the thin film pole pieces can be observed using known Bitter pattern techniques. Delays are introduced into the read signals due to the time required for domain walls to move in response to information recorded on the magnetic media. The above effects are discussed in detail in an article entitled "Domain Effects In The Thin Film Head" by R. E. Jones, Jr., which appeared in the November 1979 *IEEE Transactions on Magnetics*, Volume MAG-15, No. 6.

Thin film magnetic recording heads having a high permeability magnetic material formed of an iron-nickel-chromium alloy wherein a plurality of separate magnetic layers are used to form magnetic legs in which the demagnetizing field is reduced to avoid formation of domains within each magnetic layer to improve writing and reading characteristics are disclosed in an article entitled "Integrated Magnetic Recording Heads" by Jean-Pierre Lazzari and Igor Melnick which appeared in the *IEEE Transactions on Magnetics*, Volume MAG-7 No. 1, March 1971.

Also, the general concept of using two spaced parallel magnetic elements, each of which has its magnetic domains oriented in opposite directions, is disclosed in French Patent No. 6936864.

The geometry of the thin film magnetic layers may be varied in length, width, thickness and interpole separation. Such elements affect the magnetic circuit reluctance and, most importantly, the maximum flux within the pole pieces before saturation. The effects of the geometrical limitations are discussed in an article entitled "Finite Element Analysis of Vertical Multi-turn Thin-film Head" by Eric R. Katz which appeared in the September 1978 *IEEE Transactions on Magnetics*, Volume MAG-14, No. 5.

However, the known prior art thin film transducers having single layers of oriented magnetic material have an inherent limitation in terms of pole piece saturation and domain wall movement which constrain efficiency in writing on magnetic media and result in distortion and delay in reading from such magnetic media.

Another inherent limitation imposed on known thin film transducers is the trade-off of thickness of the pole pieces versus the achievable recording density on magnetic media. A thin film transducer requires thin pole pieces to obtain high recording resolution but this limits the flux saturation levels. Conversely, a thin film transducer having thicker pole pieces has a lower recording resolution, but a higher flux saturation level. In designing the prior art thin film transducers, it was necessary to compromise between the recording resolution and flux saturation level by selectively controlling the thickness of the pole pieces.

SUMMARY OF THE INVENTION

The present invention discloses a unique and improved thin film magnetic transducer having a substrate, first and second pole pieces formed of a selected magnetic material and terminating in a magnetic gap, which gap is defined at one end thereof by the edges of each of the pole pieces, with the first and second pole pieces having a coil positioned therebetween; and a magnetically conductive layer formed of a material having selected chemical, magnetic and physical properties and having a known magnetic saturation flux density and being positioned contiguous at least one of the first pole piece and the second pole piece and rearward of the edges forming the gap, which layer conducts magnetic flux in parallel with the pole pieces to increase the magnetic flux density at the edges of the first and second pole pieces defining the gap which, in turn, result in the concentration of magnetic flux at the edges of the first and second pole pieces forming the gap.

The present invention overcomes several inherent limitations of the known prior art thin film transducers. Known thin film transducers can have operating characteristics in terms of pole piece saturation improved by the addition of a separate magnetically conductive layer using the teachings of the present invention. Typically, the thickness of the magnetic layer in the known thin film transducers is uniform throughout the entire layer. In selecting the magnetic material for the pole pieces, the permeability and hardness are important criteria due to the physical requirements imposed on the pole faces of the edges forming the gap, such as wear characteristics and the like. However, magnetic material having a high permeability and hardness normally selected for the pole pieces has a predetermined saturation flux density which limits the maximum flux which can be carried by a pole piece formed thereof. Thus, during a write sequence, the pole pieces are initially driven into saturation rearward of the gap when the flux density reaches the maximum flux density of the magnetic material. This results in a limitation of available flux at the gap for recording. In the known prior art transducer having a main gap and back gap, the back gap is likewise subject to a limitation of available flux and saturation limits due to the geometric construction thereof.

The present invention overcomes the disadvantages of the prior art pole piece saturation limitations by providing a predetermined parallel path for the magnetic flux. In the thin film transducer using the teachings of this invention, the magnetic flux is concentrated into the edges or pole faces defining the gap such that the saturation occurs at the most desirable location, namely, adjacent the recording medium. Thus, by construction of a thin film transducer having relatively thin pole face dimensions which are highly desirable for high recording densities, together with one or more additional magnetically conductive layers conducting the magnetic flux rearward of the gap, a significantly improved thin film transducer is produced.

One advantage of the thin film transducer having a magnetically conductive layer, using the teachings of this invention, is that the overwrite capability is increased substantially and can result in an improvement of overwrite performance, without compromising high bit density operation, in the order of about 10 to 15 decibels.

Another advantage of the present invention is that there is better penetration of the magnetic flux from the pole face into the magnetic coating on the adjacent magnetic media.

Yet a further advantage of the present invention is that, with the higher flux density available at the gap, magnetic media materials having higher coercivity can be used.

Yet still another advantage in using the teachings of the present invention is that a plurality of spaced parallel magnetically conductive layers, having selected chemical, magnetic and physical properties, can be utilized without inducing the formation of domain walls within each oriented layer as disclosed in the Roscamp and Frank article which appeared in the Mar. 3, 1977, issue of i Electronics noted hereinbefore] which reduces the distortion introduced into the write and read signals and minimizes any delay interposed on the recording or reading pulses due to the delays inherent in known thin film transducers having magnetic domain walls which are continually shifting or which must otherwise be overcome in order to complete the recording of magnetic information on a magnetic media.

A still further advantage in using the teachings of the present invention is that a higher frequency thin film magnetic transducer can be fabricated which has a higher recording density capability, less distortion and higher penetration depth and greater overwrite capability.

A yet further advantage of the present invention is that the parallel magnetically conductive layers increase transducer read efficiency by decreasing the magnetic reluctance of the flux path.

BRIEF DESCRIPTION OF THE DRAWING

These and other objects and advantages of the present invention will become more apparent when considered in view of the description of the preferred embodiment taken together with the drawing wherein:

FIG. 9 is a diagrammatic cross-sectional side view of the embodiment of a thin film transducer of FIG. 6 having pole pieces formed of laminated, single domain, thin film matched pairs of a magnetic material.

DESCRIPTION OF THE PREFERRED EMBODIMENT

Figure 1:
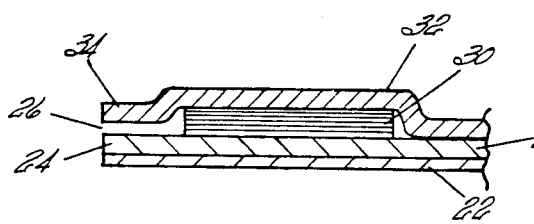
FIG. 1 is a diagrammatic cross-sectional side view of a prior art thin film magnetic transducer having thin pole piece layers which define a gap and which have a stacked helical coil therebetween.

The prior art thin film transducer of FIG. 1 has a first layer defining a first pole piece 20 which is formed of a magnetic material having a known magnetic saturation flux density. The first pole piece layer 20 is located on a substrate 22 and the first pole piece layer has one end thereof 24, which end defines one side of a magnetic gap 26.

An electrically conductive coil 30 is positioned on and insulated from the first pole piece layer 20. In the embodiment illustrated in FIG. 1, the coil is formed of a plurality of turns to form a stacked helical coil. It is anticipated that any type of coil or coil arrangement could be utilized in the known prior art transducers including that illustrated in FIG. 3. The coil 30 is adapted to have an electrical current flow therethrough which is applied to the coil through conductive leads (not shown) as is known in the art.

A second layer defining a second pole piece 32 formed of a magnetic material having a known magnetic saturation flux density is positioned on the coil 30. The second pole piece layer 32 is adapted to have one edge thereof 34 at one end thereof spaced a predetermined distance from the one edge 24 of the first pole piece layer 20 to form the magnetic gap 26 therebetween. By using techniques presently known in the art, the thickness of the gap 26 can be precisely controlled. In the prior art thin film transducer represented in FIG. 1, use of thin pole pieces results in thin pole faces on ends 24 and 34 which provide good resolution during reading and writing of information on magnetic media transported past the gap 26, but use of thin pole pieces results in low writing efficiency.

Figure 2:
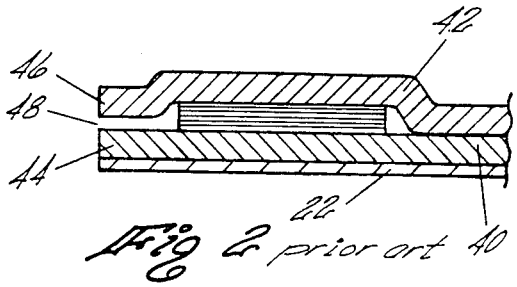
FIG. 2 is a diagrammatic cross-sectional side view of a prior art thin film magnetic transducer having thick pole piece layers which define the gap and having a stacked helical coil therebetween.

The prior art thin film transducer illustrated in FIG. 2 has a construction similar to that of the transducer described in FIG. 1 except that the first pole piece 40 and the second pole piece 42 have a greater thickness than the pole pieces 20 and 32 of FIG. 1. This results in larger pole face dimensions at edge 44 of first pole piece 40 and edge 46 of second pole piece 42. The construction of the prior art thin film transducer illustrated by FIG. 2 has less recording resolution compared to that of the prior art transducer illustrated in FIG. 1, but has higher writing efficiency due to the fact that larger pole faces are provided for conducting a greater quantity of magnetic flux into adjacent media. Edges 44 and 46 define a magnetic gap 48.

Figure 3:
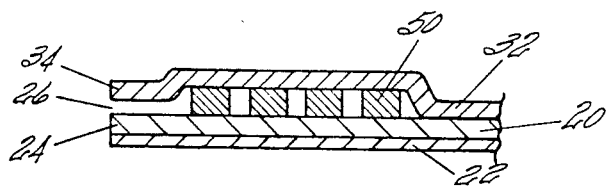
FIG. 3 is a diagrammatic cross-sectional side view of a prior art thin film magnetic transducer having thin pole piece layers and a spiral planar coil located therebetween.

FIG. 3 discloses a prior art thin film transducer wherein the first pole piece layer 20 and the second pole piece layer 32 are thin, having thin pole faces at edges 24 and 34 respectively, which form the predetermined gap 26. However, a spiral coil 50 which is formed of a plurality of planar turns is positioned between the first pole piece layer 20 and a second pole piece layer 32. The limitations and operating characteristics of the prior art thin film transducer in FIG. 3 are similar to that for the thin film transducer illustrated in FIG. 1.

In certain prior art transducers, the pole pieces may be of a laminated construction in lieu of a single layer construction.

Figure 4:
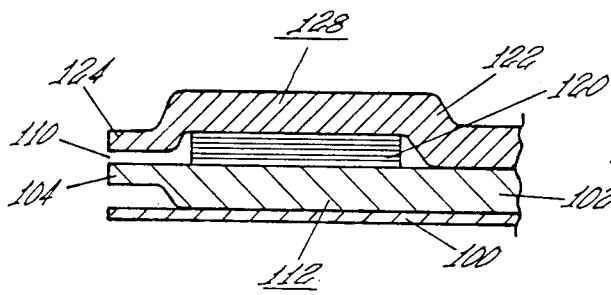
FIG. 4 is a diagrammatic cross-sectional side view of a thin film transducer having thin pole piece dimensions at the gap and pole face and a relatively thick section rearward of the gap and having a stacked helical coil therebetween.

The transducer illustrated in FIG. 4 utilizes the teachings of the present invention. Specifically, a substrate 100 has a first layer defining a first pole piece 102 formed of a magnetic material having a known magnetic saturation flux density positioned thereon. The first pole piece 102 has one edge thereof 104 which defines one side of a magnetic gap 110. The first pole piece layer 102 illustrated in FIG. 4 has a thickness at pole face 104 which is substantially the same thickness as the prior art transducers such as, for example, the thickness of the pole face dimension of end 24 of the first pole piece 20 illustrated in FIG. 1. However, rearward of the pole face 104, designated as area 112, the thickness of the first pole piece layer 102 is increased substantially beyond that of its end 104. This can be accomplished by applying, using known techniques, an additional one or more magnetically conductive layer or layers formed of a material having selected chemical, magnetic and physical properties and a known magnetic saturation flux density rearward of the gap. The magnetically conductive layer may be formed of the same material as a pole piece, or could be formed of a magnetic material having different magnetic characteristics. Preferably, the magnetic material has a substantially higher magnetic saturation flux density than the material forming the pole piece. For example, the first pole piece layer at 102 is typically formed of a selected durable permalloy material having about 80% nickel, about 19% iron and about 1% chromium, which ratio of materials results in a magnetic saturation flux density of approximately 9,500 gauss. Thus, a magnetic density in excess of 9,500 gauss results in saturation of the second pole piece layer such as that illustrated as second pole piece layer 32 of FIG. 1 in the prior art transducers. However, by increasing the thickness of that portion of the pole piece layer 122 rearward of the gap 110, such as the portion illustrated as section 128 with either the same material or of a different magnetically conductive material, the amount or quantity of magnetic flux which can be conducted by the entire pole piece layer 122 rearward of the end 124 without reaching saturation is increased substantially.

In the alternative, and as noted above, the magnetically conductive layer may be formed of a different material than that forming the pole piece, and such different material would preferably have a higher saturation flux density. For example, if the magnetically conductive layer was formed of 100% iron, the magnetic saturation flux density would approach 20,000 gauss. If the magnetically conductive layer was formed of 40% iron and 60% nickel, the magnetic saturation flux density would approach 16,000 gauss.

In the embodiment of FIG. 4, a helical coil 120 is positioned on and insulated from the first pole piece layer 102. The coil 120 is adapted to have electrical current flow therethrough and is responsive to a write signal to produce magnetic flux within the first pole piece layer 102 and a second identical pole piece layer 122 which terminates in an end 124 and which defines the other edge of gap 110.

In operation, the magnetic flux generated during a write cycle is conducted by the first pole piece layer 102 and the second pole piece layer 122 and the magnetically conductive layers formed thereon which define the relatively thick portion 112 of first pole piece layer 102 and relatively thick portion 128 of second pole piece layer 122. The magnetic flux is carried in parallel by the magnetically conductive material until it approaches the pole face on end 104 of first pole piece layer 102 and the pole face on end 124 of second pole piece layer 122. At that point, the magnetically conductive layers located in the areas designated as 112 and 128 concentrate the magnetic flux at the edges of the first pole piece layer and second pole piece layer defining the gap to provide high writing efficiency.

The better writing efficiency can be verified by measurement of the overwrite capability of the transducer at selected operating frequencies. In one test, a prior art thin film transducer having a construction of that illustrated in FIG. 1 recorded a signal on the media at two selected recording densities such as, for example, 6,000 and 3,000 flux changes per inch. The lower frequency signal was first recorded at predetermined recording conditions. The magnitude of the fundamental waveform of the pre-recorded low frequency signal was then measured. Then, the higher frequency was recorded directly over the prior recorded low frequency signal, and the residual magnitude of the fundamental waveform of the prior recorded low frequency signal was again measured and the reduction in magnitude noted. Typically, the reduction was approximately 15 to 25 decibels which gave an overwrite characteristic of approximately −15 to −25 decibels.

The performance of the overwrite test using a thin film transducer, such as that illustrated in FIG. 4 resulted in a substantially improved overwrite capability showing an improvement approaching in the order of about 10 decibels to about 15 decibels. Thus, as the overwrite capability is increased and the decibel level of the residual signal is decreased, the overwrite capability of the improved thin film transducer is greater than that of the prior art.

The increased overwrite capability is a consequence of magnetic flux penetrating deeper into the adjacent media and enables use of the thin film transducer in cooperation with higher coercivity magnetic media.

Figure 5:
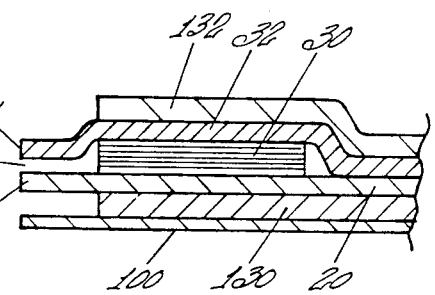
FIG. 5 is a diagrammatic cross-sectional side view of yet another embodiment of a thin film magnetic transducer having a pair of pole piece layers which are of uniform thickness therethrough and a magnetically conductive layer located adjacent each of the pole piece layers.

FIG. 5 is another embodiment of a thin film transducer using the teachings of the present invention. Essentially, the prior art transducer illustrated in FIG. 1 is utilized as part of the thin film transducer having a magnetically conductive layer 130 positioned between the first pole piece layer 20 and a substrate 100 and second magnetically conductive layer 132 located adjacent the second pole piece 32. As noted in FIG. 5, the magnetically conductive layers are positioned rearward of the pole faces on end 24 on the first pole piece layer 20 and pole face on end 34 of the second pole piece layer 32 to insure that the gap 26 is maintained. Thus, the thin pole pieces are used to provide good resolution as is typical of the thin film transducer illustrated in FIG. 1. However, an increase in writing efficiency is obtained due to the capability of the magnetically conductive layers in conducting magnetic flux in parallel to each of the pole pieces and the other magnetically conductive layer. Thus, saturation of the pole piece layers rearward of the gap, as is typical in the prior art transducers, is avoided. The magnetic flux is then concentrated at the pole faces of ends 24 and 34 to provide increased magnetic flux at the gap 26 which, in turn, results in an increase in the writing efficiency and overwrite capability of the thin film transducer.

Figure 6:
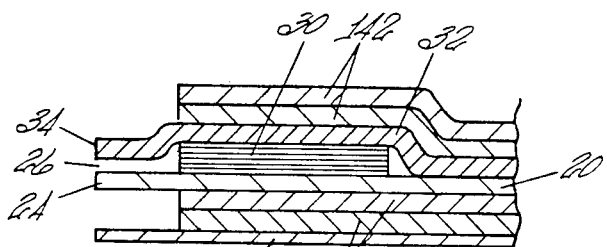
FIG. 6 is a diagrammatic cross-sectional side view of yet another embodiment of the present invention having a pair of thin pole piece layers and a plurality of magnetically conductive layers located adjacent each of the pole piece layers.

FIG. 6 is yet another embodiment wherein the prior art transducer of the type defined in FIG. 1 is sandwiched between a plurality of magnetically conductive layers 140 located adjacent pole piece 20 and a second plurality of magnetically conductive layers 142 located adjacent the second pole piece 32. In the preferred embodiment, it is desirable to use matched, pairs of magnetically conductive layers with alternating magnetization orientation to inhibit domain formation within each layer and the resulting Barkhausen noise which would otherwise be produced by unmatched pairs of magnetically conductive material.

Figure 7:
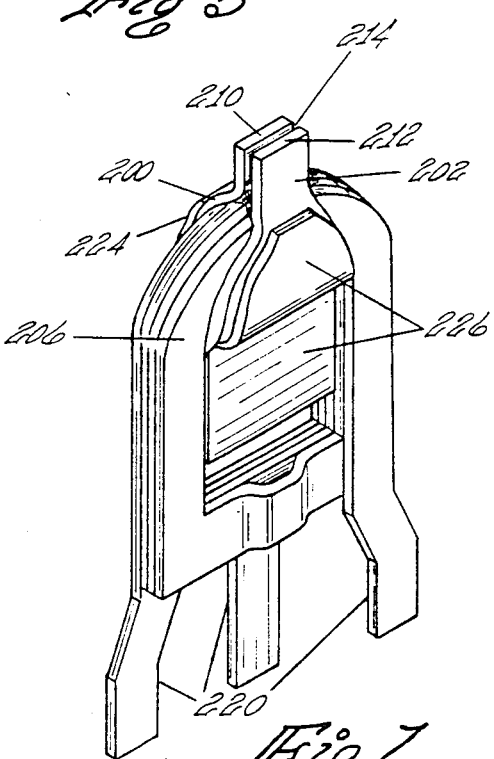
FIG. 7 is a perspective view of a thin film magnetic transducer having a single magnetically conductive layer located adjacent each pole piece layer.

FIG. 7 is a perspective view of a complete assembly of a thin film transducer having a first pole piece layer 200 and a second pole piece layer 202 having a helical coil 206 located therebetween. The first pole piece layer 200 has an end 210, and the second pole piece layer 202 has an end 212 which defines a gap shown as 214. The helical coil 206 interconnects with leads 220 which are adapted to be connected to electrical conductors or other appropriate connecting means to transmit a write signal to and a read signal from the transducer. A magnetically conductive layer 224 located on pole piece 200 and a magnetically conductive layer 226 located on pole piece 202 are illustrated in FIG. 7. As shown in FIG. 7, the magnetically conductive layers are located rearward of the gap 214.

Figure 8:
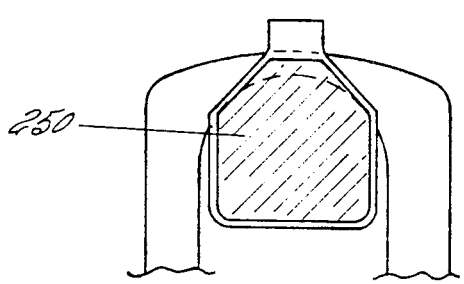
FIG. 8 is a top plan view of a thin film magnetic transducer having a plurality of magnetically conductive layers located contiguous the top pole piece layer.

FIG. 8 shows a top plan view of a thin film transducer having a plurality of magnetically conductive layers 250 located thereon. In the embodiment of FIG. 9, the transducer is formed on substrate 100 and has the pair of magnetically conductive layers 140 and 142 illustrated thereon with the pole pieces 220 and 232 being formed of laminate, single domain, thin film matched pairs of magnetic material. Laminated pole piece 220 has end 224 forming one side of the gap and end 234 of the other laminated pole piece 232 forms the other side of the gap.

It is envisioned that the magnetically conductive layers may be interposed or dispersed in any geometrical arrangement among or between pole layers. In the embodiment of FIG. 6, the predetermined spacing between the magnetically conductive layers, shown by the heavy lines, is obtained by use of insulating layers with a first layer of insulating material positioned between the magnetically conductive layers forming a known spacing therebetween, and a second insulating layer between the magnetically conductive layer and the pole piece closest to the magnetically conductive layer. Likewise, if the pole layer is of a laminated construction, the magnetically conductive layers may be interposed between, on top or on the bottom of one or more of the laminations as illustrated in FIG. 9 hereof.

The magnetically conductive material in the preferred embodiment is comprised of a nickel-iron alloy or of iron. However, it is contemplated that any suitable magnetically conductive material may be used in practicing the teachings of this invention.

What is claimed is:

1. A thin film magnetic transducer comprising
a substrate;
a first layer defining a first pole piece formed of a magnetic material having a known magnetic saturation flux density and being positioned on said substrate and having one edge at one end thereof which defines one side of magnetic gap;
an electrically conductive coil positioned on and insulated from said first pole piece layer, said coil being adapted to have an electrical current flow therethrough;
a second layer defining a second pole piece formed of a magnetic material having a known magnetic saturation flux density and being positioned on said coil, said second pole piece layer being adapted to have one edge at one end thereof spaced a predetermined distance from said one edge of said first pole piece layer to form a magnetic gap therebetween having a selected gap width; and
a first laminated, thin film matched pair of spaced parallel magnetically conductive layers having alternating magnetization formed of a material having selected chemical, magnetic and physical properties and a known magnetic saturation flux density and adapted to inhibit domain formation and Barkhausen noise within each magnetically conductive layer positioned in a spaced predetermined location relative to one or the other of the first pole piece and second pole piece and rearward of the gap, each of said magnetically conductive layers conducting magnetic flux in parallel with each other and with said first pole piece and said second pole piece to increase the magnetic flux density at the edges of the first pole piece and second pole piece defining said gap by concentrating said magnetic flux at said gap.

2. The thin film magnetic transducer of claim 1 further comprising
a first layer of insulating material positioned between said first laminated, thin film matched pair of spaced parallel magnetically conductive layers and its adjacent pole piece forming a known predetermined spacing therebetween.

3. The thin film magnetic transducer of claim 1 further comprising a second laminated, thin film matched pair of spaced parallel magnetically conductive layers haivng alternating magnetization formed of a material having selected chemical, magnetic and physical properties and a known magnetic saturation flux density and adapted to inhibit domain formation and Barkhausen noise within each magnetically conductive layer positioned in a spaced predetermined location relative to the other of the first pole piece and second pole piece and rearward of the gap, each of said magnetically conductive layers of said second pair of magnetically conductive layers conducting magnetic flux in parallel with said magnetically conductive layers, said first pole piece and said second pole piece to increase the magnetic flux density at the edges of the first pole piece and second pole piece defining said gap by concentrating said magnetic flux at said gap.

4. The thin film magnetic transducer of claim 3 further comprising a pair of insulating material layers, one of which is positioned between said first laminated, thin film matched pair of spaced parallel magnetically conductive layers and its adjacent pole piece and the other of which is positioned between said second laminated, thin film matched pair of spaced parallel magnetically conductive layers and its adjacent pole piece forming a known predetermined spacing therebetween.

5. A thin film magnetic transducer comprising a substrate;

a plurality of laminated, thin film matched pairs of spaced parallel magnetically conductive layers having alternating magnetization formed of a magnetic material having a selected chemical, magnetic and physical properties and a known magnetic saturation flux density and adapted to inhibit domain formation of Barkhausen noise in each layer being positioned on said substrate;

a first pole piece formed of a magnetic material having a known magnetic saturation flux density and being positioned in a selected stacked relationship with said plurality of pairs laminated, thin film matched pairs of spaced parallel magnetically conductive layers and having one edge of the first pole piece extending beyond the edge of the plurality of laminated, thin film matched pairs of spaced, parallel magnetically conductive layers to define at one end thereof one side of a magnetic gap;

an electrically conductive coil positioned on and insulated from said first pole piece, said coil being adapted to have an electrical current flow therethrough;

a second pole piece formed of a magnetic material having a known magnetic saturation flux density and being positioned in a selected stacked relationship with said first pole piece and said plurality of laminated, thin film matched pairs spaced parallel magnetically conductive layers and having one edge of the second pole piece extending beyond the edge of said plurality of laminated, thin film matched pairs to define at one of thereof the other side of a magnetic gap.

6. The thin film magnetic transducer of claim 5 further comprising a second plurality of laminated, thin film matched pairs spaced parallel magnetically conductive layers having alternating magnetization formed of a material having a selected chemical, magnetic and physical properties and a known magnetic saturation flux density and adapted to inhibit domain formation and Barkausen noise in each layer being positioned in a selected stacked relationship with said plurality of laminated, thin film matched pairs spaced parallel magnetically conductive layers and said second pole piece and rearward of the gap.

* * * * *